(12) United States Patent
Kaidi

(10) Patent No.: US 12,034,731 B2
(45) Date of Patent: Jul. 9, 2024

(54) EVALUATING ACCESS REQUESTS USING ASSIGNED COMMON ACTOR IDENTIFIERS

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 558 days.

(21) Appl. No.: 17/162,617

(22) Filed: Jan. 29, 2021

(65) Prior Publication Data

US 2022/0247750 A1    Aug. 4, 2022

(51) Int. Cl.
| | |
|---|---|
| *H04L 9/40* | (2022.01) |
| *G06F 11/30* | (2006.01) |
| *G06F 11/34* | (2006.01) |

(52) U.S. Cl.
CPC ........ *H04L 63/102* (2013.01); *G06F 11/3006* (2013.01); *G06F 11/3476* (2013.01)

(58) Field of Classification Search
CPC . H04L 63/102; G06F 11/3006; G06F 11/3476
See application file for complete search history.

(56) References Cited

U.S. PATENT DOCUMENTS

| | | | |
|---|---|---|---|
| 7,469,418 B1 | 12/2008 | Wilkinson et al. | |
| 7,669,239 B2 | 2/2010 | Dickelman et al. | |
| 7,805,762 B2 | 9/2010 | Rowland | |
| 8,966,036 B1* | 2/2015 | Asgekar | H04W 4/08 707/706 |
| 9,516,053 B1* | 12/2016 | Muddu | G06F 3/0484 |
| 10,235,417 B1* | 3/2019 | Sterin | G06F 16/1805 |
| 10,698,927 B1* | 6/2020 | Chin | G06F 9/547 |
| 107,212 A1 | 7/2020 | Doctor et al. | |
| 10,721,244 B2* | 7/2020 | Chiba | G06F 21/55 |
| 10,756,970 B1* | 8/2020 | Hermoni | H04L 41/149 |
| 10,887,333 B1* | 1/2021 | Pereira | G06F 21/55 |
| 10,972,345 B1* | 4/2021 | Hermoni | H04L 41/0895 |
| 11,003,773 B1* | 5/2021 | Fang | H04L 63/0263 |
| 11,023,607 B1* | 6/2021 | Mantin | G06F 21/554 |
| 11,171,846 B1* | 11/2021 | Yalagandula | H04L 43/04 |
| 2003/0208562 A1 | 11/2003 | Hauck et al. | |

(Continued)

OTHER PUBLICATIONS

International Search Report and Written Opinion in PCT Appl. No. PCT/US2022/070183 dated Mar. 21, 2022, 10 pages.

(Continued)

*Primary Examiner* — Jason Chiang
(74) *Attorney, Agent, or Firm* — Kowert, Hood, Munyon, Rankin & Goetzel, P.C.; Dean M. Munyon

(57) ABSTRACT

Techniques are discussed for grouping access requests made to a computer system using a log of access requests that includes a plurality of log entries of that include (a) a plurality of traffic indicators of the corresponding access request and/or (b) a plurality of identity indicators of a respective remote computer system that made the corresponding access request. The plurality of log entries is analyzed using a plurality of network analysis rules that are useable to group log entries according to traffic and/or identity indicators. Based on the analyzing, a plurality of groups of log entries are identified, and each group of log entries is assigned a corresponding common actor identifier (common actor ID). The determination of whether to grant a particular access request uses one or more assigned common actor IDs.

20 Claims, 8 Drawing Sheets

(56) References Cited

U.S. PATENT DOCUMENTS

| | | | | |
|---|---|---|---|---|
| 2006/0085667 | A1* | 4/2006 | Kubota | G06F 16/345 |
| | | | | 707/E17.094 |
| 2006/0195297 | A1* | 8/2006 | Kubota | G06F 16/95 |
| | | | | 707/E17.107 |
| 2009/0271506 | A1* | 10/2009 | Arai | H04L 41/0895 |
| | | | | 709/223 |
| 2010/0122345 | A1* | 5/2010 | Wu | H04L 63/145 |
| | | | | 709/226 |
| 2010/0211826 | A1* | 8/2010 | Villella | G06F 11/3476 |
| | | | | 714/39 |
| 2010/0262688 | A1 | 10/2010 | Hussain et al. | |
| 2011/0161336 | A1* | 6/2011 | Shiga | G06F 16/951 |
| | | | | 707/758 |
| 2011/0296244 | A1* | 12/2011 | Fu | G06F 11/3608 |
| | | | | 714/E11.029 |
| 2012/0246303 | A1* | 9/2012 | Petersen | G06F 16/1734 |
| | | | | 709/224 |
| 2013/0124327 | A1 | 5/2013 | Doughty et al. | |
| 2014/0006616 | A1 | 1/2014 | Aad et al. | |
| 2014/0207813 | A1 | 7/2014 | Long et al. | |
| 2015/0039757 | A1* | 2/2015 | Petersen | H04L 63/0227 |
| | | | | 709/224 |
| 2016/0127402 | A1* | 5/2016 | Veeramachaneni | H04L 63/20 |
| | | | | 726/23 |
| 2016/0366159 | A1* | 12/2016 | Chiba | H04L 63/1458 |
| 2017/0026395 | A1 | 1/2017 | Mumcuoglu et al. | |
| 2017/0116330 | A1* | 4/2017 | He | G06F 16/35 |
| 2017/0178025 | A1* | 6/2017 | Thomas | H04L 63/1425 |
| 2017/0228460 | A1* | 8/2017 | Amel | G06F 16/248 |
| 2017/0308688 | A1* | 10/2017 | Orihara | G06F 21/55 |
| 2017/0351559 | A1* | 12/2017 | Rajagopal | G06F 11/0778 |
| 2017/0366576 | A1* | 12/2017 | Donahue | H04L 63/1416 |
| 2018/0025071 | A1* | 1/2018 | Ideses | G06N 20/00 |
| | | | | 707/738 |
| 2018/0270261 | A1* | 9/2018 | Pande | G06N 7/01 |
| 2018/0357299 | A1* | 12/2018 | Miranda | G06F 16/2358 |
| 2019/0068624 | A1* | 2/2019 | Compton | H04L 63/1441 |
| 2019/0098027 | A1* | 3/2019 | Wang | H04L 63/20 |
| 2019/0182283 | A1* | 6/2019 | Nakata | H04L 63/1425 |
| 2019/0251093 | A1* | 8/2019 | Bao | G06F 11/34 |
| 2019/0280918 | A1* | 9/2019 | Hermoni | H04L 41/069 |
| 2019/0379678 | A1* | 12/2019 | McLean | G06F 16/285 |
| 2020/0034224 | A1* | 1/2020 | Nagendra | G06F 11/004 |
| 2020/0034271 | A1* | 1/2020 | Zhang | G06F 18/23213 |
| 2020/0220875 | A1* | 7/2020 | Harguindeguy | H04L 63/101 |
| 2020/0233857 | A1* | 7/2020 | Fehling | G06Q 10/10 |
| 2020/0301972 | A1* | 9/2020 | Wang | G06N 20/10 |
| 2020/0342095 | A1* | 10/2020 | Ijiro | H04L 63/1425 |
| 2021/0288981 | A1* | 9/2021 | Numainville | H04L 63/1441 |
| 2021/0400080 | A1* | 12/2021 | Kaidi | H04L 63/0281 |
| 2023/0032143 | A1* | 2/2023 | Hasumi | G06F 11/34 |

OTHER PUBLICATIONS

Solarwinds Software, "TCP/IP Traffic Monitoring, IP Performance, and Traffic Monitoring," DNS Stuff, Jul. 23, 2020, 8 pages.

* cited by examiner

| # | src | dest | bytes | city | http_method | http_user_agent | status | duration | message.netPerf.edgeIP | url_path |
|---|---|---|---|---|---|---|---|---|---|---|
| 1 | 104.227.195.115 | 23.212.3.190 | 8021 | LOSANGELES | GET | User-Agent: 1 | 200 | 442 | | 23.212.3.190 | /signin |
| 2 | 104.227.195.134 | 23.212.3.199 | 2510 | LOSANGELES | POST | User-Agent: 1 | 200 | 295 | 4693 | 23.212.3.199 | /signin |
| 3 | 104.227.195.158 | 23.212.3.199 | 0 | LOSANGELES | POST | User-Agent: 1 | 429 | 242 | 4702 | 23.212.3.199 | /signin |
| 4 | 104.227.195.210 | 23.212.3.190 | 2512 | LOSANGELES | GET | User-Agent: 1 | 200 | 428 | | 23.212.3.190 | /signin |
| 5 | 104.227.195.230 | 23.212.3.190 | 2511 | LOSANGELES | POST | User-Agent: 1 | 200 | 328 | 4699 | 23.212.3.190 | /signin |
| 6 | 104.227.195.242 | 23.212.3.199 | 2496 | LOSANGELES | POST | User-Agent: 1 | 200 | 309 | 4703 | 23.212.3.199 | /signin |
| 7 | 104.227.195.254 | 23.212.3.199 | 2508 | LOSANGELES | GET | User-Agent: 1 | 200 | 479 | | 23.212.3.199 | /signin |
| 8 | 104.227.195.42 | 23.212.3.190 | 2510 | LOSANGELES | GET | User-Agent: 1 | 200 | 385 | | 23.212.3.190 | /signin |
| 9 | 104.227.195.50 | 23.212.3.207 | 7311 | LOSANGELES | POST | User-Agent: 1 | 200 | 428 | 4700 | 23.212.3.207 | /signin |
| 10 | 104.227.195.78 | 23.212.3.190 | 2511 | LOSANGELES | GET | User-Agent: 1 | 200 | 433 | | 23.212.3.190 | /signin |
| 11 | 104.227.195.96 | 23.212.3.207 | 7947 | LOSANGELES | GET | User-Agent: 1 | 200 | 454 | | 23.212.3.207 | /signin |
| 12 | 107.77.203.210 | 23.222.79.108 | 0 | LOUISA | GET | User-Agent: 2 | 200 | 133 | | 23.222.79.108 | /webapps/mch/cmd/ |

FIG. 3

| # | src | dest | Rule 16 (60% weight): Same ASN and same IP block of 104.227.192.0/20 (https://ip.tech.io/104.227.192.0/20) | Rule 17 (20% weight): Same URI query and URI path, same method, same status, similar bytes size | Rule 18 (20% weight): Same destination IP, similar duration, user agent, time frame | Weighted ActorID (based on correlation of rule verdict to merge attribution results into a single actor) |
|---|---|---|---|---|---|---|
| 1 | 104.227.195.115 | 23.212.3.190 | {ActorID16-1,0.95} | {ActorID17-2,0.15} | {ActorID18-1,0.4} | [{ActorIDABC,0.75},{ActorIDJKL,0.10},{0,0.15}] |
| 2 | 104.227.195.134 | 23.212.3.199 | {ActorID16-1,0.95} | {ActorID17-4,0.15} | {ActorID18-2,0.4} | [{ActorIDABC,0.75},{ActorIDDEF,0.15},{0,0.1}] |
| 3 | 104.227.195.158 | 23.212.3.199 | {ActorID16-1,0.95} | {ActorID17-6,0.15} | {ActorID18-3,0.4} | [{ActorIDABC,0.75},{ActorIDGHI,0.10},{0,0.15}] |
| 4 | 104.227.195.210 | 23.212.3.190 | {ActorID16-1,0.95} | {ActorID17-3,0.15} | {ActorID18-4,0.4} | [{ActorIDABC,0.75},{ActorIDDEF,0.15},{0,0.1}] |
| 5 | 104.227.195.230 | 23.212.3.190 | {ActorID16-1,0.95} | {ActorID17-4,0.15} | {ActorID18-1,0.2} | [{ActorIDABC,0.75},{ActorIDDEF,0.15},{0,0.1}] |
| 6 | 104.227.195.242 | 23.212.3.199 | {ActorID16-1,0.95} | {ActorID17-4,0.15} | {ActorID18-2,0.4} | [{ActorIDABC,0.75},{ActorIDDEF,0.15},{0,0.1}] |
| 7 | 104.227.195.254 | 23.212.3.199 | {ActorID16-1,0.95} | {ActorID17-3,0.15} | {ActorID18-5,0.4} | [{ActorIDABC,0.75},{ActorIDDEF,0.15},{0,0.1}] |
| 8 | 104.227.195.42 | 23.212.3.190 | {ActorID16-1,0.95} | {ActorID17-3,0.15} | {ActorID18-4,0.4} | [{ActorIDABC,0.75},{ActorIDDEF,0.15},{0,0.1}] |
| 9 | 104.227.195.50 | 23.212.3.207 | {ActorID16-1,0.95} | {ActorID17-5,0.15} | {ActorID18-5,0.6} | [{ActorIDABC,0.75},{ActorIDDEF,0.15},{0,0.1}] |
| 10 | 104.227.195.78 | 23.212.3.190 | {ActorID16-1,0.95} | {ActorID17-3,0.15} | {ActorID18-1,0.4} | [{ActorIDABC,0.75},{ActorIDDEF,0.15},{0,0.1}] |
| 11 | 104.227.195.96 | 23.212.3.207 | {ActorID16-1,0.95} | {ActorID17-2,0.15} | {ActorID18-5,0.6} | [{ActorIDABC,0.75},{ActorIDDEF,0.15},{0,0.1}] |
| 12 | 107.77.203.210 | 23.222.79.108 | {ActorID16-2,0.95} | {ActorID17-7,0.95} | {ActorID18-6,0.5} | [{ActorIDXYZ,0.85},{ActorIDLMN,0.10},{0,0.05}] |

| ActorID | Probability | Rule 1 | Rule 2 | Rule 3 | ... | Log types | Last update | Threat Score |
|---|---|---|---|---|---|---|---|---|
| ActorIDABC | 0.85 | Session ID= dsfkjdfnjkasdnf | IP=1.2.3.4<br>Flow=<br>a) merchantA.com/addItemB<br>b) merchantA.com/checkout<br>c) merchantC.com/validateCreditCard | Associated IPs:<br>1.2.3.4<br>1.2.3.5<br>1.2.3.6 | ... | Web logs<br>Network logs | 20201010 | 0.9 |
| ActorIDXYZ | 0.8 | Session ID= hlmdglmhmhgdhdmdlg | N/A | Associated IPs:<br>1.2.3.4<br>1.2.3.7 | ... | Web logs<br>WAF logs | 20201008 | 0.2 |

*FIG. 5*

EVALUATING ACCESS REQUESTS USING ASSIGNED COMMON ACTOR IDENTIFIERS

BACKGROUND

Technical Field

This disclosure relates generally to computer security, and in particular techniques to recognize and mitigate abusive access requests.

Description of the Related Art

Any computer system that is configured to receive access requests from other computer systems is at risk of being the target of abusive traffic in furtherance of improper purposes such as an attempt to receive unauthorized access to an electronic resource. Abusive traffic is even more likely to be received by computer systems that are connected to unsecured networks such as the Internet. Defending computer systems from abusive traffic, therefore, is an important aspect of operating a computer system. Applicant recognizes that existing approaches to computer security, particular handling of requests received via a network, can be improved.

BRIEF DESCRIPTION OF THE DRAWINGS

FIG. 3 is an example table of log entries in accordance with various embodiments.

FIG. 4 is an example table with the log entries of FIG. 3 grouped according to matches from individual network analysis rules and assigned common actor IDs in accordance with various embodiments.

FIG. 5 is an example of an actor ID table of FIG. 2 in accordance with various embodiments.

Figure 1:
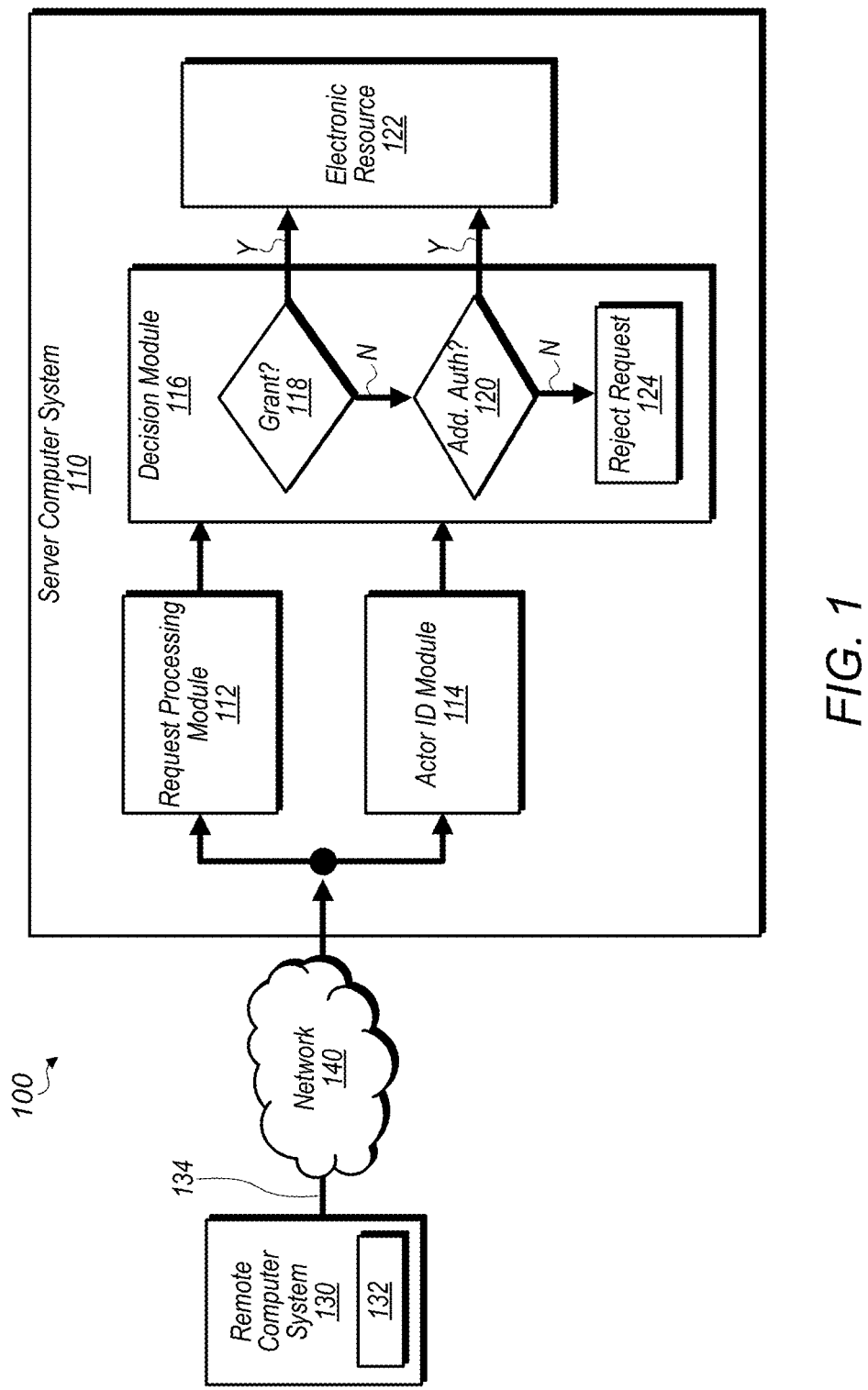
FIG. 1 is a block diagram illustrating an embodiment of a computer system configured to receive access requests and determine whether to grant them using determined common actor IDs.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive access requests" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" network analysis rules would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, a request processing platform). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. Embodiments of the request processing platform described herein thus enable the functionality of request processing to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

It can be difficult to efficiently and accurately identify and isolate abusive network traffic, especially when such traffic comes from different endpoints on different layers via different internet protocol (IP) addresses. For example, it can be difficult to differentiate that a first amount of traffic corresponds to a first type of specific abuse (or a specific type of attack) and a second amount of traffic corresponds to a second specific type of abuse. IP addresses can be useful in this regard, but the present disclosure recognizes that IP addresses alone are insufficient to differentiate the actors behind those IP addresses. This is because IP addresses can be obfuscated, and an attacker may control a number of different machines in different locations and on different networks. An attacker may also use one or more first IP addresses at a first time, and later switch to using one or more second, different IP addresses at a later time.

Accordingly, if analysis is based only on IP addresses, it is much more difficult block threat groups readily on-the-fly and in an accurate manner. Even if using additional available information regarding network traffic, it can be challenging to identify whether abusive traffic from different network endpoints stems from a single common actor, however, techniques described herein allow such a determination to be made.

The present disclosure teaches the analysis of network-based accesses and the generation of a synthetic attribute called a "common actor identifier (common actor ID)" based on high levels of real-time correlation. Use of this attribute makes it is easier to identify and block related accesses that are associated with threats. In various embodiments, this common actor ID can be added to ingested network access logs as a synthetic column such that the derived actor ID can be calculated once and used many times as needed. In various instances, common actor ID can be used to address some of the issues associated with relying on IP addresses (and other information) to monitor threats, especially in a context where abusive traffic can come from many or even hyper distributed sources having different IP address. According to the techniques disclosed herein, instead of merely grouping by IP addresses, it becomes possible to query for traffic based on common actors. Further, this grouping may be aided by taking into account different endpoints, log sources, time periods, and more. Being able to associate various individual abuses to one or a few actors may facilitate alerts about abusive traffic and techniques to ameliorate abusive traffic.

Referring now to FIG. 1, a block diagram is shown depicting a computer system 100 configured to receive access requests and determine whether to grant them using determined common actor IDs in accordance with various embodiments. Computer system 100 includes a server computer system 110 and one or more remote computer systems 130 that are configured to communicate over a network 140. While FIG. 1, only depicts a single server computer system 110 and a single remote computer system 130, it will be understood that that techniques discussed herein may be implemented by any number of server computer systems 110 (e.g., a single server, a data center including many servers, or a distributed cloud of servers) that may be in communication with any number of remote computer system 130. For example, a server computer system 110 that is implemented on thousands of servers may be in communication with millions of remote computer systems 130.

Server computer system 110 is a computer system that is operable to receive requests 134 from remote computer systems 130 to access one or more electronic resources 122 and determine whether to grant or deny such requests 134. In various embodiments, server computer system 110 is implemented by software running on a computer system (e.g., a desktop computer, a laptop computer, a tablet computer, a mobile phone, a server) or a plurality of computer systems (e.g., a network of servers operating as a cloud). In other embodiments, server computer system 110 is implemented in specialized hardware (e.g., on an FPGA) or in a combination of hardware and software. Thus, while the server computer system 110 is referred to herein as a "server" to differentiate it from the remote computer systems 130, the server computer system 110 is not limited to embodiments where server computer system 110 is implemented by a single server. In various embodiments, server computer system 110 is operable to perform other functions in addition to receiving access requests 134 and determining whether to grant them.

In various embodiments, server computer system 110 includes a request processing module 112, an actor ID module 114, and decision module 116 that together are operable to grant or reject requested access to one or more electronic resources 122. In various embodiments, request processing module 112, actor ID module 114, and decision module 116, may be implemented together as part of a request processing platform. In various embodiments, electronic resource 122 may include but is not limited to one or more secured electronic files or web pages, electronically-stored media (e.g., music, video), or a representation of a good or service offered for purchase. In various embodiments, electronic resource 122 is stored on server computer system 110, but in other embodiments electronic resource 122 is stored on another computer system (not shown) but where access to the electronic resource 122 is controlled by server computer system 110.

Request processing module 112 is operable to facilitate the various tasks associated with determining whether to grant or deny a request 134, excluding the common actor ID functionality discussed in reference to actor ID module 114. In various embodiments, request processing module 112 is operable to identify the requested electronic resource 122 and determine whether and how to provide access to the requested electronic resource 122. In various embodiments, request processing module 112 is operable to determine that request 134 is authorized (e.g., request 134 was made during a session with server computer system 110 in which remote computer system 130 was signed in to an authorized user account, request 134 includes the appropriate credentials or cryptographic information, the request 134 is for an electronic resource 122 to which access is available to a user account associated with request 134). In various embodiments, request processing module 112 is also operable to perform functions such as load balancing and/or determining a sufficiently efficient way to fulfill request 134. In various embodiments, request processing module 112 provides as output a determination of whether to grant request 134.

Actor ID module 114 is operable to implement the techniques discussed herein to facilitate determining a common actor ID for request 134 and determine whether the common actor ID for request 134 corresponds to one or more previous requests that have been flagged as being abusive (or potentially abusive). As discussed herein, log entries for request 134 and previously received access requests are stored by server computer system 110 in one or more logs in various embodiments. In various embodiments, such logs include at least a plurality of log entries that each include (a) a plurality of traffic indicators of the corresponding access request and (b) a plurality of identity indicators of a respective remote computer system that made the corresponding access request. In various embodiments, "identity indicators" are any of a number of factors that are indicative of the particular remote computer system 130 that made an access request 134 (e.g., an IP address, MAC address, user agent, etc. of the particular remote computer system 130) and "traffic indicators" are any of a number of factors that are indicative of the particular access request 134 (e.g., what is requested, when it was requested, where the request is being made, what kind type of request is being made). Accordingly, in various instances, a log entry includes one or more identity indicators that indicate "who" (i.e., which remote computer system 130) is making the access request 134 and one or more traffic indicators that indicate "what," "where," "when," "why," and "how" for the access request 134. Additional examples of types of identity indicators and traffic indicators are discussed herein in reference to FIGS. 2 and 3. In various embodiments, the log may also include other log entries that lack an identity indicator, a traffic indicator, or both.

Actor ID module 114 is operable to access such logs of access request and analyze a plurality of log entries using a plurality of network analysis rules (e.g., network analysis rules 202 discussed in reference to FIG. 2) to form groups of log entries. In various embodiments, at least one of the plurality of network analysis rules is useable to group log entries using one or more traffic indicators and at least one of the plurality of network analysis rules is useable to group log entries according to one or more identity indicators. In various embodiments, some network analysis rules are usable to group log entries by only traffic indicators, some network analysis rules are useable to group log entries by only identity indicators, and/or some network analysis rules are useable to group log entries by both identity indicators and traffic indicators. As discussed in further detail in reference to FIGS. 2, 4, and 5, in various instances a group of log entries may be grouped as a result of matches identified between the log entries according to one or more of the plurality of network analysis rules.

After log entries have been grouped, actors ID module 114 is operable to assign a common actor ID to groups of log entries (e.g., a common actor ID in column 408 discussed in reference to FIG. 4). As used herein, a "common actor ID" is an identifier assigned to a plurality of log entries that, based on matches determined using one or more network analysis rules, appear to be associated with a common entity. For example, an authorized user might access his or her account using multiple devices with different IP addresses but might be determined to be associated with a common actor based on the common use of the user account, the geographic area from which the request originate, the time of such request, and various other factors. Requests from an abusive entity, however, may also be grouped based on matches between the various log entries for such requests. For example, an abusive entity might use a script that accesses similar endpoints at server computer system 110, delivers similar payloads, at similar times, and from IP addresses that belong to the same autonomous system number (ASN). Such commonalities may be identified by querying requests 134 against previously-received requests according to the network analysis rules as discussed herein in further detail in reference to FIGS. 2, 4, and 5. Such querying may be performed as requests 134 are received such that a plurality of log entries in the one or more logs have been analyzed prior to a subsequent request 134 being received and one or more common actor IDs being assigned to at least some of the plurality of log entries.

Decision module 116 is operable to receive input from request processing module 112 and actor ID module 114 and, based on such input, determine whether to grant or deny request 134. In various embodiments, decision module 116 implements decision logic (e.g., represented as decision blocks 118 and 120) that decides whether to grant or deny request 134 based on the input provided by request processing module 112 and/or actor ID module 114. At block 118, if both request processing module 112 and actor ID module 114 indicate that the request 134 should be granted, access to electronic resource 122 is granted. At block 120, if either or both request processing module 112 and actor ID module 114 indicate that the request should not be granted (or should not be granted without further authentication), a request for additional authentication is sent to remote computer system 130 (e.g., to the particular network device located at the network address indicated in request 134) before approving the access request 134. Such additional authentication may include, for example, a CAPTCHA check, a request to provide user name and password information before granting request 134, a request to provide a second factor of authentication (e.g., by acknowledging a message sent via a separate channel such as an email sent to an email address on record), etc. If decision module 116 determines to reject a request, a message may be sent to remote computer system 130 at block 124. In various embodiments, actor ID module 114 operates in parallel to request processing module 112 and is operable to provide input to decision module 116 before a decision is made at block 118. In various instances, however, the process performed by actor ID module 114 may take longer than the process performed by request processing module 112. In various instances, decision module 116 is operable to delay the decision on whether to grant request 134 for a period of time (e.g., 40 ms) until input is received from actor ID module 114. If input is not received from actor ID module 114 after the period of time, request 134 may be granted or denied based only on the input from request processing module 112 and the input from actor ID module 114 may be disregarded or used to evaluate a subsequent request 134.

Remote computer system 130 is a computer system that is operable to send request 134 to access to one or more electronic resources 122. In various embodiments, remote computer system 130 is implemented by software running on a computer system (e.g., a desktop computer, a laptop computer, a tablet computer, a mobile phone, a server) or a plurality of computer systems (e.g., a network of servers operating as a cloud). In other embodiments, remote computer system 130 is implemented in specialized hardware (e.g., on an FPGA) or in a combination of hardware and software. Remote computer system 130 includes one or more application 132 that are operable to send request 134. In various embodiments, application 132 may be any of a number of types of applications running on remote computer system 130 including but not limited to: a web browser operable to send a request 134 by accessing a uniform resource locator (URL), an application (or program, client, plugin, extension, terminal, or command-line) operable to send a request 134 via an application program interface (API), a non-browser application (e.g., a virtual wallet application, a payments or shopping application, a media playback application) operable to send a request 134 via either a URL or API, etc.

Request 134 is a request to access an electronic resource 122 to which access is controlled by server computer system 110. Upon receiving an indication of the request 134 (e.g., the request 134 itself, a log entry prepared for the request 134), server computer system 110 is configured to determine whether to grant or deny such a request 134. In various embodiments, request 134 is a request to access one or more secured electronic files or web pages, a request to purchase access to electronically-stored media, a request to purchase a good or service, etc. As discussed herein, upon receiving request 134, server computer system 110 is configured to represent request 134 with one or more log entries in a log of access request. Various types of requests 134 and log entries used to represent them are discussed in further detail herein in reference to FIGS. 3-5.

Network 140 is configured to facilitate communication between remote computer system 130 and server computer system 110 including the sending of request 134 and a subsequent response(s) from server computer system 110. Network 140 may be implemented by any number of wired (e.g., ethernet) and/or wireless transmission mediums (e.g., WiFi, cellular data networks) working alone or in conjunction, and may include a local are area network and/wide area network. In various embodiments such a wide area network includes the Internet.

Accordingly, by grouping log entries corresponding to requests 134 and assigning common actor IDs using network analysis rules, abusive traffic can be identified and mitigated by denying the requests 134 associated therewith even if the abusive traffic is being sent from different remote computer systems 130 having different IP addresses. Thus, in some instances, grouping request together as discussed herein (a) permits log entries that include different IP addresses to be grouped together with the same common actor ID and (b) permits log entries that include the same IP address to grouped in different groups with different common actor IDs. By using sets of network analysis rules to identify patterns, commonalities (e.g., similar modes of operation, similar types of remote computer systems, similar groups of IP addresses) between requests 134 can be identified and used to correlate relate traffic having these commonalities together under a single common actor ID. When subsequent requests 134 are received that have some or all of these commonalities, these subsequent requests 134 may also be assigned the same common actor ID. Further, the traffic associated with a common actor ID can be analyzed together to determine whether the traffic is abusive, and if so, how much of a danger the common actor poses to server computer system.

Figure 2:
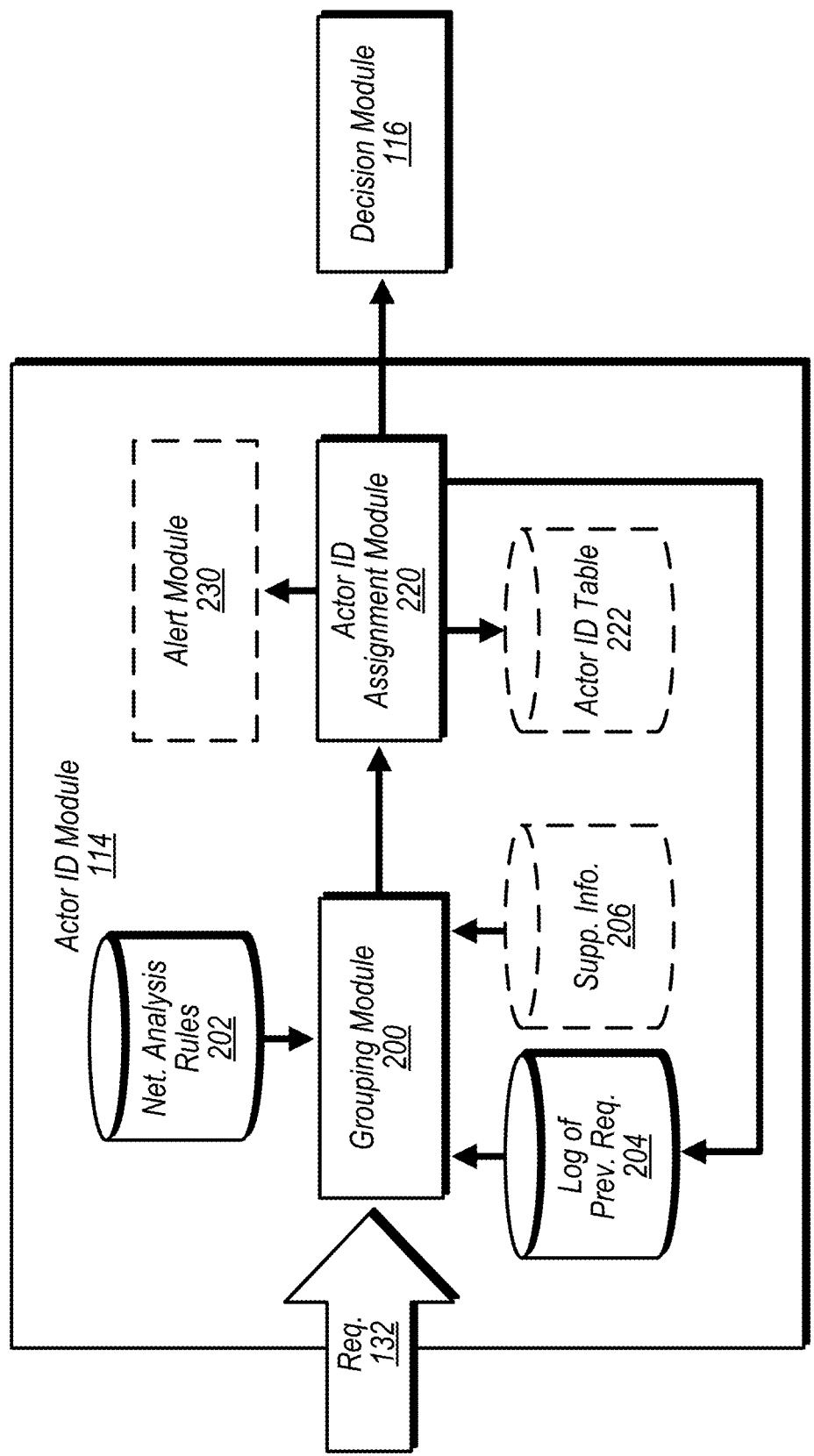
FIG. 2 is an expanded block diagram of the actor ID module of FIG. 1 in accordance with various embodiments.

Referring now to FIG. 2, an expanded block diagram is shown depicting components of actor ID module 114 in accordance with various embodiments. Actor ID module 114 includes a grouping module, a plurality of network analysis rules 202, one or more logs 204 of previously received access requests, and an actor ID assignment module 220 in various embodiments. Actor ID module 114 is operable to evaluate an incoming request 134 and output to decision module 116 the results of such evaluation (e.g., whether to grant request 134, whether to deny request 134 because request 134 is corresponds to a common actor that has been determined to be abusive, whether to request additional authentication). In various embodiments, actor IC module 114 optionally (indicated by dashed lines) includes one or more datastores of supplemental information, an actor ID table 222, and an alert module 230.

In various embodiments, grouping module 200 is operable to analyze request 134 using one or more network analysis rules 202 and log entries for previously received access requests that have been previously analyzed using the one or more network analysis rules 202. In some embodiments, grouping module 200 is also operable to access one or more datastores of supplemental information 206 to implement one or more network analysis rules 202. Various sources of supplemental information 206 may be analyzed including but not limited to: records of user account logins and active sessions; records of user account profiles including information about IP addresses, device fingerprints, or other identity indicators that have previously been associated with particular user accounts and patterns of use previously associated with user accounts; lists of IP addresses or device finger prints that have previously been associated with abusive traffic; user behavior patterns (e.g., how long pages are browsed and in what sequence) that might be indicative of user identification, time patterns (e.g., indicating typical access times, indicative of a user's time zone); or various other information useable to supplement the log entries corresponding to access requests.

In various embodiments, log entries for the previous access requests are stored in one or more logs 204. In various embodiments, information corresponding to request 134 and previously received requests is captured in corresponding log entries that are stored in one or more logs 204 as, for example, entries in one or more databases. While request 134 and logs 204 are depicted separately in FIG. 2, in various embodiments a log entry for request 134 is stored in a log 204 prior to the actor ID determination discussed herein. In such embodiments, request 134 may be the most recent entry (or the most recent unanalyzed entry) in a log 204. Such log entries include information about the remote computer system 130 making the corresponding request (referred to herein as "identity indicators") and information about the corresponding request itself (referred to herein as "traffic indicators"). In various embodiments, identity indicators are usable to differentiate hardware or software configurations for various remote computer systems 130 (e.g., a user agent), uniquely identify hardware or software installed on various remote computer systems 130 (e.g., a serial number), a machine's name received in respond to an active probe, indicate credentials associated with the corresponding request (e.g., a cryptographic indicator stored on remote computer system 130 and attested to in a request), and otherwise identify remote computer system 130. As discussed herein, the source IP address and information such as the netblock to which the source IP belongs and autonomous system number (ASN) indicating associated groups of IP addresses for a request are identity indicators. In various embodiments, traffic indicators are useable to identify a destination address for a request, the size of a request, an HTTP response status code for the request, a payload included with the request, the time and date a request was received, traffic patterns such as payloads, destination, endpoints, and URI paths, an HTTP referrer for a request, and other such information useable to differentiate requests. In some instances, traffic indicators reflect a particular action taken on a web page (e.g., a click on a particular link) or even records of inputs from the remote computer system 130 making the request (e.g., switching browser tabs, scrolling on a webpage, cursor speed). Note that while various examples are discussed herein with reference to log entries or log files, the techniques disclosed herein could be operated with any source(s) of information regarding network-based accesses (and as such the terms "log", "log entry", "log file" etc. should be broadly interpreted to refer to any such information source). The contents of various log entries in log 204 are discussed in further detail herein in reference to FIG. 3.

In various embodiments, grouping module 200 uses a plurality of network analysis rules 202 to query request 134 against log entries for previous access requests in log 204 to try to identity matches between information associated with request 134 and log entries of previous access requests. In such embodiments, the individual network analysis rules 202 specify portions of a given log entry (corresponding to a given request) to query against corresponding portions of other log entries for other requests, and identifying groups of log entries in which the specified portions match. In embodiments in which log entries for request 134 and previous requests are stored as rows in tables, for example, network analysis rules 202 indicate which columns in request 134 to query against corresponding columns of log entries in log 204. For example, a first rule 202 might specify that a source IP address and ASN for request 134 is queried against previously-received requests in log 204 and a second rule might specify that a destination IP address, duration, user agent, and time and date received is queried against the previously-received requests in log 204. In some embodiments, a first network analysis rule 202 is useable to identify log entries associated with a shared internet protocol (IP) address and a shared pattern of accessed uniform resource locators (URLs) and payloads. In some embodiments, a second network analysis rule 202 is useable to identity log entries associated with a shared device fingerprint and a shared pattern of traffic to one or more shared uniform resource locators (URLs). In some embodiments, a third network analysis rule 202 is useable to identity log entries associated with a shared autonomous system number (ASN) and a shared period of time. In some embodiments, a fourth network analysis rule 202 is useable to identity log entries associated with a shared endpoint, shared payload frequency, and a shared user-agent string. In various embodiments, one or more network analysis rules 202 are useable to access supplemental information 206 to add context to requests (e.g., by accessing a list of interlinked IP addresses or device fingerprints that have been previously associated with a particular user account). As used herein, "interlinked IP addresses" are IP addresses that have previously been shown to be related (e.g., by being used by the same user account) as shown by supplemental information 206. As used herein, a "device fingerprint" refers to information collected about the software and hardware of remote computer system 130 for the purpose of identification (e.g., operating system information, browser fingerprints, etc.). Accordingly, when log entries for requests (e.g., request 134 and previously received requests) are matched according to an individual rule, these log entries may be grouped together. If other matches are found according to other rules, these other matches may similarly be grouped. As discussed herein, in various instances, groups corresponding to one or more individual rules may be grouped together and assigned the same common actor ID.

It will be understood that any number of queries may be made between information associated with request 134 and log entries in log 204 to determine matches. Table 1 below includes a non-exhaustive list of rules that may be employed by grouping module 200 to query information associated with a particular request 134 against previous request to identity matches between the particular request 134 and one or more previously-received access requests. These rules may be used together in any combination as discussed herein:

TABLE 1

Non-Exhaustive List of Network Analysis Rules

| Rule # | Portion(s) of Log Entries Queried | Description |
|---|---|---|
| 1 | Session ID, Source IP address | Determine whether request 134 shares a session ID with a previous request. In some embodiments, session IDs are not reused, so a reuse of a session ID with different IP addresses may indicate session hijacking. |
| 2 | Source IP address, Input Action, Destination Endpoint, Uniform Resource Identifier (URI) Path | Determine whether request 134 is part of a sequence of related actions. If the same set of actions that are all associated with a first IP address, these actions might be part of the same sequence. If the same set of actions subsequently occurs associated with a second IP address, even if the first IP address and second IP address do not match, this may indicate the same actor is using a script to perform the same actions using different IP addresses. |
| 3 | Time Received, Source IP address, information from supplemental information 206 indicating source IP addresses are interlinked | Determine whether there are matches between sequence of requests received over a period of time from IP interlinked addresses that are associated with a particular user account (e.g., a list of the last five IP addresses the particular user account has used to log in). If interlinked IP addresses are used to perform the same sequence of events, this may indicate that the user account has been hijacked. |
| 4 | Device OS, Source IP Address, Destination Endpoint | Determine whether there are matches between sequence of requests made from remote computer systems 130 running the same operating system and using the same IP address to perform the sequence. This might indicate that a common actor is using the same script to perform the sequence, even if the IP addresses for the various instances of the sequence do not match (e.g., because the actor changes the IP address after running the sequence). |
| 5 | Device Fingerprint, Payload, Input Action, Destination Endpoint, Uniform Resource Identifier Path | Determine whether there are matches between sequences of requests made from remote computer systems 130 with similar device fingerprints (e.g., as determined by the result of any of a number of fingerprinting algorithms). |
| 6 | Time Received, Payload, Destination | Determine whether there are matches between sequences of requests made with the same |

TABLE 1-continued

Non-Exhaustive List of Network Analysis Rules

| Rule # | Portion(s) of Log Entries Queried | Description |
|---|---|---|
|  | Endpoint, User Agent String | frequency of sending payloads to the same endpoints with a similar user agent. In some instances, the detected user agent may also be compared to the broadcast user agent to determine whether there is a mismatch, which might itself by indicative of abusive traffic. |
| 7 | ASN, Payload, Input Action, Destination Endpoint, URI Path | Determine whether there are matches between sequences of requests made from IP addresses corresponding to the same ASN over a period of time. This may be indicative, for example, of an attack being launched from the same entity (e.g., an ASN corresponding to a university) even if the individual IP addresses do not match. |
| 8 | Time Received, Destination Endpoint, | Determine whether a sequence of traffic is directed to a particular endpoint over a block of time. If the same endpoint is repeatedly target, this may indicate abuse being directed towards the endpoint in particular. |
| 9 | Destination Endpoint, Payload | Determine whether there are matches between sequences of requests directed to the same endpoint having similar payloads, regardless of source IP address. |
| 10 | Port Probe of Remote Computer System | Determine whether there are matches between requests that are associated with remote computer systems 130 that have the same results from a port probe, regardless of the source IP address of the requests. |
| 11 | Referrer, Payload, Input Action, Destination Endpoint, URI Path | Determine whether there are matches between sequences of requests made from the same referrer URI. |
| 12 | Login Status, Machine Learning Synthetic Portion | After analyzing log entries associated with particular user accounts using a machine learning algorithm to identify typical use patterns, determine whether there are requests associated with a user account that indicate a deviation from the typical use patterns. A deviation in behavior may reflect a hijacked user account. |
| 13 | URI Path, Destination IP Address, Cookies, Header, Payload, Status Code | Determine whether there are matches between sequence of requests made to the same URI path and destination IP address having similar cookies, header, payload, and HTTP response status codes. In some instances, attackers will bypass load balancers and proxies operating in request processing module 112 and directly access particular destination IP addresses, so patterns of accesses indicating such bypassing may be associated with the same actor running a script. |
| 14 | Source fully qualified domain name (FQDN) | Determine whether external web response listeners, if used, are the same, for instance using services such as BURP COLLABORATOR. |
| 15 | Time Received, Input Action | Determine whether there are matches between sequences of requests having the same pattern of inputs over the same period of time, which might indicate a script is performing the sequence, regardless of the source IP address. |
| 16 | ASN, Source IP Address | Determine whether there are matches between requests having the same ASN and source IP addresses within a block of IP addresses. Such a match might be indicative, for example, of an attack launched from within an organization (e.g., a university campus having a large number of IP addresses). |
| 17 | URI Query, URI Path, Input Action, Status Code, Payload | Determine whether there are matches between sequences of requests having the same pattern of inputs, URI queries and payloads that are directed towards the same URI path and received the same status code. |
| 18 | Destination IP address, Duration, User Agent, Time Received | Determine whether there are matches between requests to the same destination IP address, with the same duration, received at a similar time frame, and from remote computer systems 130 having similar user agents. |

In some instances, one or more network analysis rules 202 are useable to identity sequences of related requests (e.g., requests that are directed to similar endpoints and payloads). For example, a first sequence might include a request accessing the third choice on an origin webpage, selecting the fourth choice in an intermediate webpage linked from the origin webpage, and clicking a "checkout" button fifteen seconds later. If a sequence of subsequent requests 134 shows the same pattern (e.g., third choice on origin webpage, fourth choice on intermediate webpage, clicking checkout 9-11 seconds later), the requests 134 associated with the subsequent sequence may be identified as having the same common actor ID as the first sequence. Such a similar sequence, for example, may indicate that the same actor is using the same script to try to make fraudulent purchases on different websites.

As discussed herein, in various embodiments, different combinations of network analysis rules 202 may be used together to evaluate requests of the same type. For example, requests received from web browsers may be evaluated using a first set of rules, requests received via API calls may be evaluated using a second set of rules. In some of such embodiments, in addition to evaluating requests of the same type using a particular set of rules as a baseline, additional sets of rules may be used in more specific user cases. For instance, if a particular type of attack has been recently observed (e.g., login above"), the rules may be adjusted to improve detection of that particular type of attack (e.g., apply additional rules, apply difference weightages or rules). In other embodiments, however, the same set of rules may be used to evaluate requests received via web pages and requests received via API calls. In various embodiments, grouping module 200 provides an indication of a match between request 134 and one or more previous access requests as a result of a query conducted according to an individual network analysis rule 202 (individual rule matches are discussed in further detail in reference to columns 402, 404, and 406 in FIG. 4). In various instances, matches in queries may be exact, but in other instances grouping module 200 is operable to employ approximate matching techniques (e.g., fuzzy logic). In some embodiments, a match between log entries for various requests may be weighted by a degree of certainty calculated based on how closely the log entries match (e.g., a nearly identical match having a 0.95 confidence indicator, a more distant match having a 0.15 confidence indicator).

Actor ID assignment module 220 is operable to receive indications of matches by individual network analysis rules 202 and determine whether a common actor may be associated such individual matches, assign a common actor ID to request 134 as appropriate, and provide output to decision module 116 useable to determine whether to grant or deny the request 134 as discussed herein. In various embodiments, actor ID assignment module 220 is also operable to output information to alert module 230 to prepare alerts or reports to network security personnel about potential abusive traffic for further analysis or adjustment to security practices. In various embodiments, alert module 230 is operable to determine whether or not a security incident report would be created and if a security incident report is generated, notify security analysts for investigation.

In various embodiments, actor ID assignment module 220 is operable to correlate matches between a log entry for request 134 and log entries previously received requests in log 204 generated from queries from individual network analysis rules 202 using any combination of techniques. Thus, groups of log entries that have been grouped together according to a match by an individual rule 202 may be combined with other groups that have been grouped together according to matches by other individual rules 202. In some instances, matches from different individual rules may be correlated by the groups formed by such rules 2020 overlapping in whole or in part. Accordingly, the same common actor ID may be assigned to the log entries in both groups. In other instances, some or all log entries in groups formed from individual matches may share one or more traffic indicators or identity indicators. For example, matches in Rule 2, 3, and 4 in Table 1 may all share a common source IP address (because these rules group based on source IP address in addition to other indicators) and be assigned the same common actor ID. Similarly, matches in Rule 7, 8, and 9 in Table 1 may all be associated with same device fingerprint and assigned the same common actor ID, even though none of Rules 7, 8, or 9 queries for matching device fingerprints. In various embodiments, the various rules 202 being applied may be assigned weights that are indicative of the importance of a match determined by the various rules 202. For example, referring briefly to FIG. 4, the column 402 for Rule 16 is assigned a 60% weight and the columns 404 and 406 for Rules 17 and 18 are assigned a 20% weight, and these weights may be added together. Thus, matches between log entries grouped together under Rules 16 and 17 are given an 80% weight in some embodiments. In some instances, matches for individual rules also include a confidence indicator, so the final grouping for a particular log entry may be weighted by both the weight assigned to the individual rules as well as the confidence indicator of the matches for each individual rule. I In various embodiments, actor ID assignment module 220 is operable to add the one or more common actor IDs assigned to request 134 to log 204 (e.g., by storing the common actor ID(s) in a synthetic portion of log 204, by storing the common actor ID(s) in a data object embedded within log 204). As used herein, a "synthetic portion" of a log 204 is a portion (e.g., an additional column or an additional row) that is added to log entries reflecting analysis performed on the access requests but was not included with the access requests when they were received. In various embodiments, actor ID assignment module 220 is operable to add, for the various log entries analyzed by actor ID module 114, synthetic portions to log 204 including an array including the common actor ID(s) assigned to the log entries. Such synthetic portions are discussed in further detail herein in reference to FIG. 4.

In various embodiments, actor ID assignment module 220 is also operable to store common actor IDs in an actor ID table 222. In various embodiments, actor ID table 222 stores information about the common actor IDs that have been assigned over a period of time (e.g., over the last 12 months). In some embodiments, actor ID table 222 includes the traffic indicators and identity indictors shared by log entries that have been assigned a particular common actor ID. In instances where the common actor ID is added to log 204 as a synthetic portion, the common actor ID added to log 204 and the common actor ID entry in actor ID table 222 may be linked together to facilitate faster data access across tables. Accordingly, in such embodiments actor ID table 222 is useable as an index to query for log entries that have been assigned a particular common actor ID. In various embodiments, actor ID table 222 also includes indications of which individual rules were used to generate the actor IDs as well as the results generated by running the individual rules. Further, such linking may also facilitate revisions of synthetic portions as new information is received. For example, if a first set of log entries have been assigned ActorIDABC with a moderate level of certainty (e.g., between 40 and 60%) based on matches between Rule 1 and 3, if a subsequently received second set of requests 134 show a pattern also shared by the first set of log entries, the first set of log entries and the subsequently received second set of requests 134 may all be assigned ActorIDABC at a higher level of certainty (e.g., between 75 and 95%). Actor ID table 222 is discussed in further detail herein in reference to FIG. 5.

Referring now to FIG. 3, a table 300 with a plurality of log entries is depicted. Table 300 is an example of the kind of information that is included in log entries stored in a log 204, but it will be understood that in various embodiments log entries may have substantially more types of information beyond the eleven columns shown in FIG. 3. Further, while table 300 is shown as a table with rows and columns, this is merely exemplary. In various embodiments, log entries in logs 204 may be stored in any of a number of suitable ways. Further, in some embodiments, a particular request 134 may be represented by multiple log entries in multiple logs 204. For example, a first set of traffic and identity indicators for the particular request 134 may be stored in a first log 204 and second, different set of traffic and identity indicators for the particular request 134 may be stored in a second log 204.

As shown in table 300, twelve log entries are shown as having eleven indicators: two identity indicator 302 and nine traffic indicators 304. In various embodiments, log entries may indicate which type of request 134 was submitted (e.g., a web request, an API request, etc.), such that different sets of network analysis rules may be used to analyze the different types of log entries (e.g., as shown in FIG. 3, log entries 1-11 are web request and log entry 12 is an API request as indicated by the URI path column). In the embodiment shown, the identity indicators 302 represent the source IP address and user agent strings corresponding to the request. It will be understood that a user agent string may include information about the requesting computer system 130 such as the type of operating system, whether the application 132 used to make the request 134 is a browser an if so what type, etc. However, for clarity the user agent strings have been abbreviated to just "1" or "2" in table 300.

As shown in table 300, traffic indicators 304 include, respectively, the destination IP address, the number of bytes in the corresponding request 134, the geographic location associated with the IP address, whether the request 134 includes a HTTP get or push, the HTTP response status code for the request 134, the duration for the request 134, the size of a message payload included in the request 134 (if any), an edge IP assigned to the request 134, and a URI path for the request 134. In various embodiments, log entries might also include but is not limited to: the source port for the request 134, the destination port for the request 134, a URL used to submit the request, a content type for the request (e.g., image, text, etc.), an indication of the host to which the request 134 was sent, a URI query included with the request 134, a referrer URL for the request 134, etc.

Referring now to FIG. 4, a table 400 is depicted with the log entries of table 300 grouped according to matches from individual network analysis rules 202 and assigned common actor IDs. Table 400 depicts matches made using three of the network analysis rules 202 from Table I: Rules 16, 17, and 18. As discussed above, Rule 16 (corresponding to column 402) is useable to identity log entries that share an ASN and a source IP address that is in a same block of IP address (e.g., the block of IP address in 104.227.192.0/20). Rule 17 (corresponding to column 404) is useable to identity log entries that shares a URI query, URI path, status code, size in bytes, and method (e.g., a similar string of inputs). Rule 18 (corresponding to column 404) is useable to identity log entries that share a destination IP, duration, user agent, and time frame. In the embodiment shown in FIG. 4, Rule 16 has a 60% weight and Rules 17 and 18 both have a 20% weight.

Column 402 shows that the log entries 1-11 have been matched together under an individual rule actor identifier (also referred to herein as an individual rule result) for Rule 16 with a 0.95 confidence indicator and log entry 12 has been grouped by itself, also with a 0.95 confidence indicator. Column 404 shows that the log entries have been matched together under six different individual rule actor identifiers: log entries 1 and 11 are grouped under ActorID17-2 with a 0.15 confidence indicator; log entries 4, 7, 8, and 10 are grouped under ActorID17-3 with a 0.15 confidence indicator; log entries 2, 5, and 6 are grouped under ActorID17-4 with a 0.15 confidence indicator; and log entries 3, 9, and 12 are grouped by themselves. Column 406 shows that the log entries have been matched together under six different individual rule actor identifiers: log entries 1 and 5 are grouped under ActorID18-1 with a 0.4 and 0.2 confidence indicator, respectively; log entries 2 and 6 are grouped under ActorID18-2 with a 0.4 confidence indicator; log entries 4 and 8 are grouped under ActorID18-4 with a 0.4 confidence indicator; log entries 7, 9, and 11 are grouped under ActorID18-5 with a 0.4, 0.6, and 0.6 confidence indicator, respectively; and log entries 3 and 12 grouped by themselves.

When the matches from the individual rules are correlated together to determine the common actor ID assigned to log entries 1-12, the final result is shown in column 408. In some instances, log entries that have been group together by individual rule actor identifiers may be grouped together with the same common actor ID. For example, log entries 2 and 5 are grouped together under Rule 16 as well as under Rule 17, and as a result may be grouped together under the same common actor ID. Additionally, log entries 1-11 are associated with the same city, user agent string, and have a destination IP address in the 23.212.3.XXX range, and as a result these log entries may be grouped together under the same actor ID. Indeed, log entries 1-11 have all been assigned ActorIDABC and log entries 2 and 5 have also been assigned ActorIDDEF. It will be understood that any string of any length may be used as common actor ID (e.g., a common actor ID does not necessarily start with "ActorID . . ."). The length of the common actor ID may be based on how many different entities interact with server computer system 110 and permit an assignment of a unique common actor ID to each entity that sends requests to sever computer system 110.

In the embodiment shown in FIG. 4, each of log entries 1-12 has been assigned two identified common actor IDs with a corresponding probability, which is calculated by adding up the various weights associated with the rules and the confidence indicator of the matches. In various embodiments, the confidence indicators of the matches may be normalized prior to being weighted. For log entry 1, for example the result is that this log entry has been assigned a primary common actor ID of ActorIDABC, a second common actor ID of ActorIDJKL, and one or more tertiary common actor IDs that together have a confidence indicator of 0.15. In the embodiment shown in FIG. 4, tertiary common actor IDs are lumped together in an "other" category represented by a 0. In various embodiments, the primary common actor ID, primary common actor ID confidence indicator, secondary common actor ID, secondary common actor ID confidence indicator, a 0 representing tertiary actor IDs, and combined tertiary actor ID confidence indicator may be stored in an array, as seen in column 408. In various embodiments, the confidence indicator for a particular common actor ID is common across all log entries that have been assigned that common actor ID. In such embodiments, this confidence indicator represents that greatest weight for any log entry assigned to the common actor ID or an average confidence level across all attributions to that common actor ID. In other embodiments, however, the individual log entries will have an attribution to one or more actors IDs, with a range of confidence indicators for each attributed actor ID (e.g., a first log entry and a second log entry attributed to ActorIDABC will have difference confidence indicators).

Referring briefly to table 300, various log entries that have been grouped together share at least one identity indicator or at least one traffic indicator with another log entry with which it has been grouped. For example, as shown in the second column of table 300, each of log entries 1-11 have a source IP of 104.227.195.XXX and these source IP addressed are grouped in the same ASN. Each of these log entries have been assigned a primary common actor ID of ActorIDABC with a 0.75 confidence level. Log entries 2, 3, and 6 also share at least two traffic indicators: all three are post requests 134 that were sent to designation IP address 23.212.3.199. Thus, members of a given group of log entries share at least one identity indicator and at least one traffic indicator with the other members of the given group in various instances. In other instances, however, members of a given group of log entries may only have matching traffic indicators or only have matching identity indicators in various other instances. Additionally, log entries 2 and 4-11 have been assigned a secondary common actor ID of ActorIDDEF with confidence levels of 0.15 while log entries 1 and 3 have been assigned other seconding common actor IDs with confidence levels of 0.10. Such groupings and confidence levels are mutable, however, as additional requests 134 are received. For example, analysis of subsequent requests 134 may be reveal that ActorIDABC may actually be attributable to separate actors and the log entries may be regrouped. Additionally, analysis of subsequent requests 134 may be reveal that ActorIDGHI and ActorIDJKL are attributable to the same common actor and log entries 1 and 3 may be grouped together.

Referring now to FIG. 5, an example actor ID table 222 is depicted. As shown in FIG. 5, the example actor ID table 222 includes two actor IDs: ActorIDABC and ActorIDXYZ (column 502). As shown in column 504, the probability assigned to ActorIDABC is 0.85 and the probability assigned to ActorIDXYZ is 0.8. As discussed herein, in various embodiments this probability is calculated based on the weights assigned to individual rules 202 and the confidence level of matches between log entries under the individual rules 202. Columns 506, 508, and 510 include the indicators shared by log entries that have been assigned the common actors IDs. For example, a first plurality of log entries that have been assigned ActorIDABC share the same session ID (column 506), a second plurality of log entries are part of a shared flow of actions originating from a common IP address (column 508), and a third plurality of log entries have a source IP address that is on a list of associated IP addresses. In various instances, the first, second, and third plurality of log entries may all be the same group of log entries, but in other embodiments log entries might not belong to all three (e.g., a particular log entry shares the session ID in column 506 and has a source IP on the list in column 510, but does not include the source IP or flow in column 508. Additionally, FIG. 5 includes an ellipsis column 512, which indicates that more than three rule results may be included in an actor ID table 222. Indeed, any number of rules may be used to assign common actor IDs. Column 514 includes indications of the various types of requests 134 that have been assigned to the actor IDs (e.g., requests 134 corresponding to web log entries and network log entries for ActorIDABC, requests 134 corresponding to web log entries and Web Application Firewall (WAF) log entries for ActorIDXYZ). Column 516 includes indications of the date a particular common actor ID was last assigned. In various embodiments, common actor IDs are assigned a threat score that indicates an amount of risk attributed to a given common actor ID. In some of such embodiments, the threat score is a dynamic score that is updated by our security rules/detection alerts and can be tied to the common actor IDs. That is, if a common actor ID is assigned to requests that represent fraudulent attempts to purchase goods, for example, a high threat score might be assigned to that common actor ID whereas a common actor ID assign to a legitimate user performing legitimate actions would be assigned a low threat score. The threat score may be adjusted dynamically and in real-time in response to requests. In various embodiments, thresholds may be set such that all requests attributed to a common actor ID above the threshold are blocked.

Figure 6:
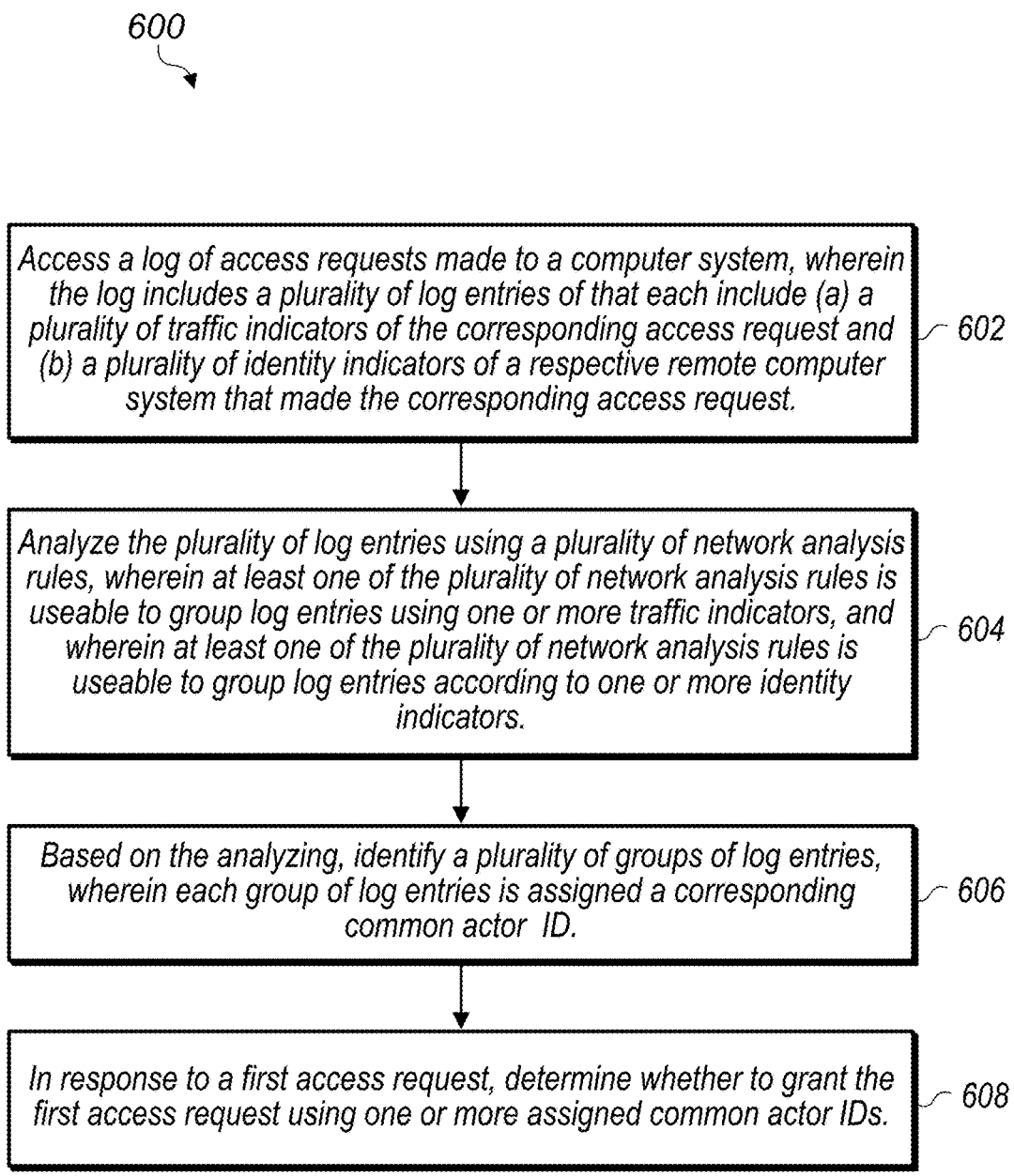
FIG. 6 is flowchart illustrating an embodiment of an actor ID assignment method in accordance with the disclosed embodiments.
Figure 7:
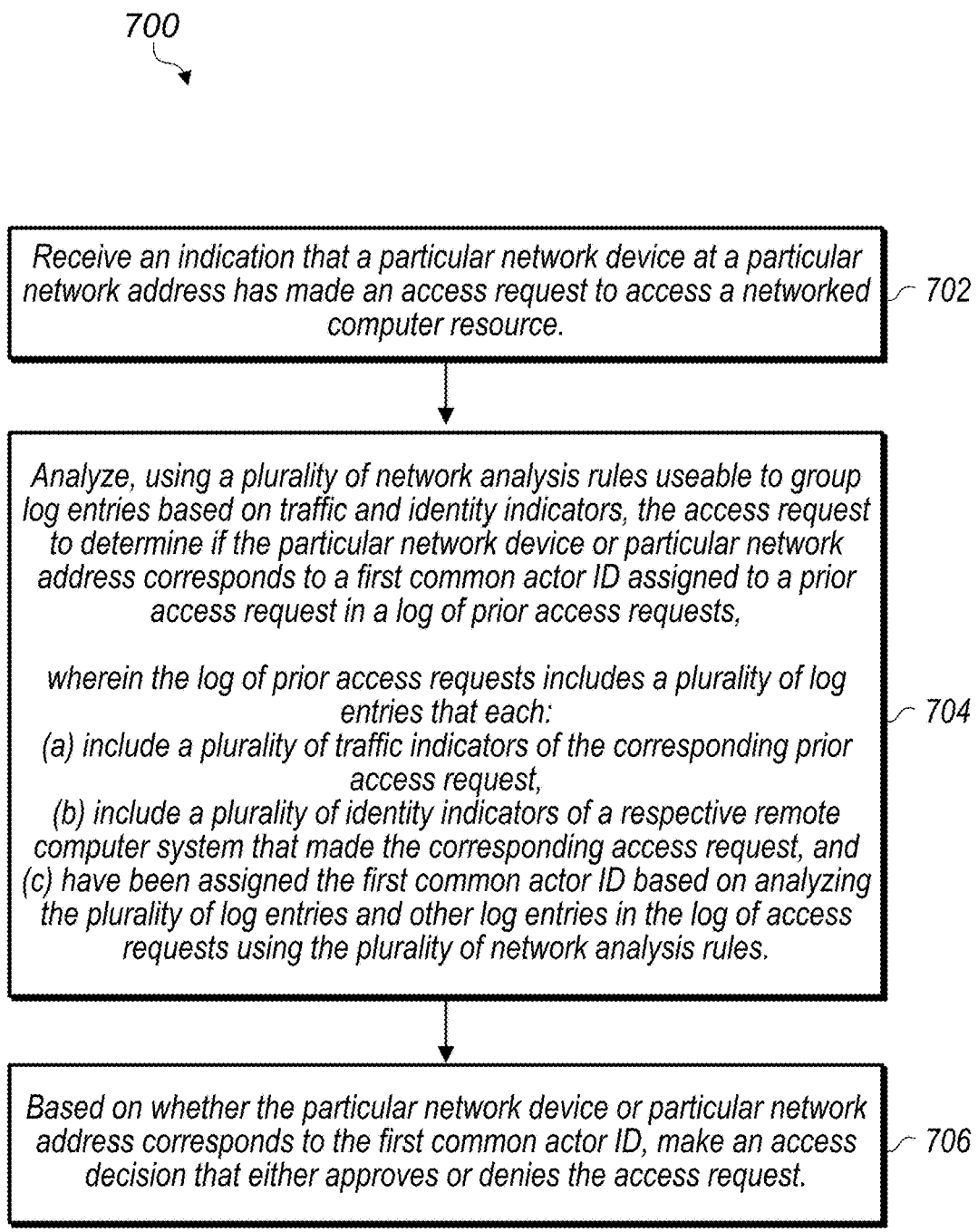
FIG. 7 is flowchart illustrating an embodiment of a request evaluation method in accordance with the disclosed embodiments.

FIGS. 6 and 7 illustrate various flowcharts representing various disclosed methods implemented with computer system 100. Referring now to FIG. 6, a flowchart depicting an actor ID assignment method 600 is depicted. In the embodiment shown in FIG. 6, the various actions associated with method 600 are implemented by server computer system 110. At block 602, server computer system 110 accesses a log 204 of access requests 134 made to the server computer system 110. As discussed herein, log 204 includes a plurality of log entries of that each include (a) a plurality of traffic indicators of the corresponding access request 134 and (b) a plurality of identity indicators of a respective remote computer system 130 that made the corresponding access request 134. At block 604, server computer system 110 analyzes the plurality of log entries using a plurality of network analysis rules 202. As discussed herein at least one of the plurality of network analysis rules 202 is useable to group log entries using one or more traffic indicators, and least one of the plurality of network analysis rules 202 is useable to group log entries according to one or more identity indicators. At block 606, server computer system 110 identifies, based on the analyzing in block 604, a plurality of groups of log entries. Each group of log entries is then assigned a corresponding common actor ID. At block 608, server computer system 110, in response to a first access request 134, determines whether to grant the first access request using one or more assigned common actor IDs.

Referring now to FIG. 7, a flowchart depicting a request evaluation method 700 is depicted. In the embodiment shown in FIG. 7, the various actions associated with method 700 are implemented by server computer system 110. At block 702, server computer system 110 receives an indication that a particular network device (e.g., a remote computer system 130) at a particular network address has made an access request 134 to access a networked computer resource (e.g., electronic resource 122). At block 704, server computer system 110 analyzes, using a plurality of network analysis rules 202 useable to group log entries based on traffic and identity indicators, the access request 134 to determine if the particular network device or particular network address corresponds to a first common actor ID assigned to a prior access request 134 in a log 204 of prior access requests. As discussed herein, the log 204 of prior access requests includes a plurality of log entries that each: (a) include a plurality of traffic indicators of the corresponding prior access request, (b) include a plurality of identity indicators of a respective remote computer system that made the corresponding access request, and (c) have been assigned the first common actor ID based on analyzing the plurality of log entries and other log entries in the log 204 of access requests using the plurality of network analysis rules 202. At block 706, server computer system 110 makes an access decision that either approves or denies the access request 134 based on whether the particular network device or particular network address corresponds to the first common actor ID.

Exemplary Computer System

Figure 8:
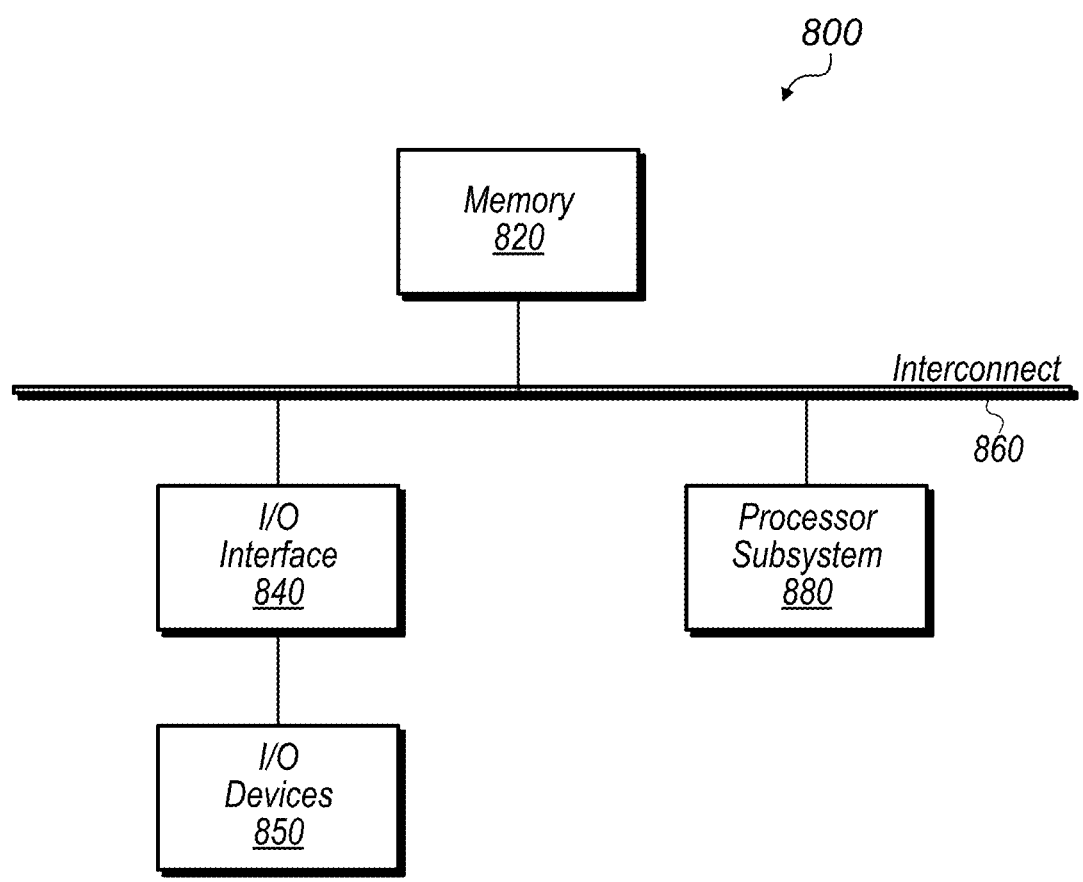
FIG. 8 is a block diagram of an exemplary computer system, which may implement the various components of FIGS. 1 and 2.

Turning now to FIG. 8, a block diagram of an exemplary computer system 800, which may implement the various components of computer system 100 (e.g., server computer system 110, remote computer system 130) is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable to store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device (e.g., configured to communicate over WiFi, Bluetooth, Ethernet, etc.), another example or an I/O device 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method related to identifying a common actor on the Internet who uses multiple communication devices, comprising:

accessing, at a computer system, a log of access requests made to the computer system, wherein the log includes a plurality of log entries that each include (a) a plurality of traffic indicators of the corresponding access request and (b) a plurality of identity indicators, wherein the identity indicators are characteristic of a hardware or software configuration of a respective remote computer system that made the corresponding access request;

analyzing, with the computer system, the plurality of log entries using a plurality of network analysis rules, wherein
at least one of the plurality of network analysis rules is useable to group log entries using one or more traffic indicators,
at least one of the plurality of network analysis rules is useable to group log entries according to one or more identity indicators,
respective individual rules of the plurality of network analysis rules are associated with respective rule weights,
analyzing a given log entry of the plurality of log entries produces a plurality of individual rule results corresponding to the plurality of network analysis rules, and
the individual rule results are associated with respective rule result confidence levels;

based on the analyzing, identifying, with the computer system, a plurality of groups of log entries, wherein each group of log entries is assigned a corresponding common actor identifier (common actor ID), wherein the identifying includes
grouping the given log entry into two or more different groups of log entries with different common actor IDs, and
determining ID confidence levels corresponding to the different common actor IDs using the rule result confidence levels and the rule weights;

storing, at the computer system, the assigned common actor IDs for the identified groups of log entries, wherein
the storing includes storing an array that includes the different common actor IDs and the ID confidence levels corresponding to the different common actor IDs, and
the array is associated with the given log entry; and in response to a first access request, determining whether to grant the first access request using one or more assigned common actor IDs.

2. The method of claim 1, wherein members of a given group of log entries share at least one identity indicator and at least one traffic indicator with the other members of the given group.

3. The method of claim 1,
wherein individual rules of the plurality of network analysis rules specify portions of a given log entry of the plurality of log entries to query against corresponding portions of others of the plurality of log entries; and
wherein identifying a plurality of groups of log entries includes identifying groups of log entries having matching portions that are specified by one or more of the plurality of network analysis rules.

4. The method of claim 1,
wherein identifying the plurality of groups of log entries includes:
  identifying a first group of log entries based on first rule results for a first network analysis rule of the plurality of network analysis rules; and
  identifying a second group of log entries based on second rule results for a second network analysis rule of the plurality of network analysis rules;
the method further comprising:
determining that one or more individual log entries belongs to the first group and the second group;
wherein the log entries in the first group and the second group are assigned the same common actor ID.

5. The method of claim 1,
wherein identifying the plurality of groups of log entries includes:
  identifying a first group of log entries based on first rule results for a first network analysis rule of the plurality of network analysis rules; and
  identifying a second group of log entries based on second rule results for a second network analysis rule of the plurality of network analysis rules;
the method further comprising:
determining that one or more log entries in the first group and one or more log entries in the second group share one of more traffic indicators and one or more identity indicators;
wherein the log entries in the first group and the second group are assigned the same common actor ID.

6. The method of claim 1, wherein storing the assigned common actor IDs includes storing, at the computer system, a common actor ID index that includes, for a plurality of respective common actor IDs:
  the respective common actor ID;
  one or more rule results for the plurality of network analysis rules that have been associated with the respective common actor ID, wherein a given rule result corresponds to shared traffic indicators and/or shared identity indicators of log entries that have had the respective common actor ID appended;
  a common actor ID probability calculated based on weights corresponding to the plurality of network analysis rules; and
  a threat score corresponding to the respective common actor ID, wherein a given threat score indicates an amount of risk attributed to a given common actor ID.

7. The method of claim 1,
wherein the plurality of log entries includes a first set of log entries corresponding to a first type of access requests and a second set of log entries corresponding to a second, different type of access requests;
wherein the plurality of network analysis rules includes a first set of network analysis rules corresponding the first type of access requests and a second set of network analysis rules corresponding to the second, different type of access request; and
wherein identifying the plurality of groups of log entries permits grouping log entries corresponding with the first type of access request with log entries corresponding with the second, different type of access request.

8. The method of claim 1, wherein:
the log of access requests is associated with a first source type; and
the plurality of network analysis rules comprises a first combination of network analysis rules having a corresponding first set of individual rule weights.

9. The method of claim 8, further comprising:
accessing, at a computer system, an additional log of access requests associated with a second source type different from the first source type, wherein the additional log includes an additional plurality of log entries; and
analyzing, with the computer system, the additional plurality of log entries using an additional plurality of network analysis rules, wherein the additional plurality of network analysis rules comprises a second combination of network analysis rules having a corresponding second set of individual rule weights.

10. The method of claim 9, wherein the first source type is a web browser source type and the second source type is an application programming interface (API) source type.

11. A non-transitory, computer-readable medium storing instructions that when executed by a computer system cause the computer system to perform operations comprising:
  accessing, at a computer system, a log of access requests made to the computer system, wherein the log includes a plurality of log entries of that each include (a) a plurality of traffic indicators of the corresponding access request and (b) a plurality of identity indicators, wherein the identity indicators are characteristic of a hardware or software configuration of a respective remote computer system that made the corresponding access request;
  analyzing, with the computer system, the plurality of log entries using a plurality of network analysis rules useable to group log entries based on traffic and identity indicators, wherein
    respective individual rules of the plurality of network analysis rules are associated with respective rule weights,
    analyzing a given log entry of the plurality of log entries produces a plurality of individual rule results corresponding to the plurality of network analysis rules, and
    the individual rule results are associated with respective rule result confidence levels;
  based on the analyzing, identifying, with the computer system, a plurality of groups of log entries, wherein each group of log entries is assigned a corresponding common actor identifier (common actor ID), wherein the identifying includes
    grouping the given log entry into two or more different groups of log entries with different common actor IDs, and
    determining ID confidence levels corresponding to the different common actor IDs using the rule result confidence levels and the rule weights;
  storing, at the computer system, the assigned common actor IDs for the identified groups of log entries, wherein
    the storing includes storing an array that includes the different common actor IDs and the ID confidence levels corresponding to the different common actor IDs, and
    the array is associated with the given log entry; and
  in response to a first access request, determining whether to grant the first access request using one or more assigned common actor IDs.

12. The non-transitory, computer-readable medium of claim 11, wherein the plurality of network analysis rules includes:
    a rule useable to identify log entries associated with a shared internet protocol (IP) address and a shared pattern of accessed uniform resource locators (URLs) and payloads.

13. The non-transitory, computer-readable medium of claim 11, wherein the plurality of network analysis rules includes:
    a rule useable to identify log entries associated with a shared device fingerprint and a shared pattern of traffic to one or more shared uniform resource locators (URLs).

14. The non-transitory, computer-readable medium of claim 11,
    wherein the operations further include accessing one or more additional data stores;
    wherein the plurality of network analysis rules includes a particular rule useable to identify log entries associated with requests made from remote computer systems with a shared operating system and a shared internet protocol (IP) address and a shared pattern of traffic to one or more shared endpoints; and
    wherein analyzing the plurality of log entries using the plurality of network analysis rules includes using the particular rule and the one or more additional data stores to analyze the plurality of log entries.

15. The non-transitory, computer-readable medium of claim 11, wherein the plurality of network analysis rules includes:
    a rule useable to identify log entries associated with a shared autonomous system number (ASN) and a shared period of time.

16. The non-transitory, computer-readable medium of claim 11, wherein the plurality of network analysis rules includes:
    a rule useable to identify log entries associated with a shared endpoint, shared payload frequency, and a shared user-agent string.

17. The non-transitory, computer-readable medium of claim 11,
    wherein the operations further include accessing one or more additional data stores;
    wherein the plurality of network analysis rules includes a particular rule useable to identify log entries associated with interlinked internet protocol (IP) addresses and a shared period of time; and
    wherein analyzing the plurality of log entries using the plurality of network analysis rules includes using the particular rule and the one or more additional data stores to analyze the plurality of log entries.

18. A method comprising:
    receiving, at a computer system, an indication that a particular network device at a particular network address has made an access request to access a networked computer resource;
    analyzing, by the computer system using a plurality of network analysis rules useable to group log entries based on traffic and identity indicators, the access request to determine if the particular network device or particular network address corresponds to a first common actor identifier (common actor ID) assigned to a prior access request in a log of prior access requests, wherein the log of prior access requests includes a plurality of log entries that each:
    (a) include a plurality of traffic indicators of the corresponding prior access request,
    (b) include a plurality of identity indicators, wherein the identity indicators are characteristic of a hardware or software configuration of a respective remote computer system that made the corresponding access request, and
    (c) have been assigned the first common actor ID based on analyzing the plurality of log entries and other log entries in the log of access requests using the plurality of network analysis rules, wherein
        respective individual rules of the plurality of network analysis rules are associated with respective rule weights,
        analyzing a given log entry of the plurality of log entries produces a plurality of individual rule results corresponding to the plurality of network analysis rules,
        the individual rule results are associated with respective rule result confidence levels, and
        assigning the first common actor ID includes grouping a given log entry into two or more different groups of log entries with different common actor IDs and determining ID confidence levels corresponding to the different common actor IDs using the rule result confidence levels and the rule weights; and
    based on whether the particular network device or particular network address corresponds to the first common actor ID, making, with the computer system, an access decision that either approves or denies the access request.

19. The method of claim 18, wherein the log of prior access requests includes a second plurality of log entries that each:
    (a) include a plurality of traffic indicators of the corresponding prior access request,
    (b) include a plurality of identity indicators of a respective remote computer system that made the corresponding access request, and
    (c) have been assigned one or more other common actor IDs based on analyzing the second plurality of log entries and other log entries in the log of access requests using the plurality of network analysis rules.

20. The method of claim 18, wherein the access decision includes sending a request for additional authentication to the particular network device at the particular network address before approving the access request.

* * * * *